United States Patent [19]

Anderson

[11] 4,057,114
[45] Nov. 8, 1977

[54] HAND-HELD ICE AUGER

[76] Inventor: Paul J. Anderson, 947 Poplar St., Hancock, Mich. 49930

[21] Appl. No.: 647,209

[22] Filed: Jan. 7, 1976

[51] Int. Cl.² ............................................. E21B 3/02
[52] U.S. Cl. ...................................... 173/26; 173/140; 173/163; 192/67 R; 403/379
[58] Field of Search .......................... 173/140, 163, 26; 192/34, 67; 403/379, 378

[56] References Cited

U.S. PATENT DOCUMENTS

| 1,287,228 | 12/1918 | Christiansen | 403/379 X |
| 2,621,767 | 12/1952 | McDevitt | 192/67 R |
| 3,453,897 | 7/1969 | Adinolfi | 192/34 X |
| 3,731,751 | 5/1973 | Rusco | 173/26 |
| 3,828,861 | 8/1974 | Verkuil | 173/140 X |
| 3,882,737 | 5/1975 | Crim et al. | 192/34 X |

Primary Examiner—Ernest R. Purser
Assistant Examiner—William F. Pate, III
Attorney, Agent, or Firm—Quarles & Brady

[57] ABSTRACT

A flexible shaft is connected directly to the crank shaft of a snowmobile engine by a coupler. The flexible shaft drives a reduction gear which is enclosed in a hand-held housing. The reduction gear rotates a drive shaft at a substantially reduced speed and the drive shaft connects to the ice auger bit through a coupler which allows disengagement of the bit when no downward pressure is applied to the housing.

2 Claims, 6 Drawing Figures

HAND-HELD ICE AUGER

BACKGROUND OF THE INVENTION

The field of the invention is portable augers, and more particularly, ice augers driven by motorized recreational vehicles such as snowmobiles.

A number of ice augers suitable for attachment to the engine of a snowmobile have been proposed. In U.S. Pat. No. 3,602,321, for example, a hand-held ice auger is coupled to the crank shaft of a snowmobile engine by a belt drive. Also, in U.S. Pat. No. 3,731,751, a hand-held ice auger is driven from a snowmobile drive train by a telescopic drive shaft in which flexibility is provided by a pair of universal joints. Such prior ice augers often involve elaborate setup procedures, including the hoisting of the snowmobile off of its track and the attachment of substantial special purpose hardware thereto. Also, such prior systems allow minimal mobility of the ice auger with respect to the snowmobile and some require that the engine be turned off if rotation of the ice auger is to be stopped.

SUMMARY OF THE INVENTION

The present invention relates to an auger which is attached by a flexible shaft to the shaft of an internal combustion engine, and more particularly, to coupling means at one end of the flexible shaft for attaching it to the engine, and a gear reduction means contained within a hand held housing and connected to the other end of the flexible shaft. The gear reduction means rotates a drive shaft which is releasably connected to the auger bit by a unique coupler.

The auger bit extends downward from the hand-held housing into contact with the surface into which a hole is to be bored. The auger shaft is rotatably fastened to the housing and is movable along its axis of rotation between an engaged position in which the rotary motion of the gear drive shaft is imparted to the auger shaft and a disengaged position in which the auger shaft is not driven.

A general object of the invention is to provide a hand-held auger which is driven by a remote engine such as that found on a snowmobile or tractor. By providing a substantial speed reduction in the hand-held housing, the flexible shaft may be connected directly to the engine crank shaft which rotates at a relatively high speed. Also, because the flexible shaft rotates at high speed ($\omega$), the torque (T) applied to it is minimal for the amount of power ($P=T\omega$) it typically must couple to the auger through the gear reduction means. As a result, a lighter weight and more flexible shaft is made possible by placing the gear reduction means in the hand-held housing.

A more specific object of the invention is to provide an improved coupling between the flexible shaft and the engine crank shaft. The coupling includes means for guiding the end of the flexible shaft into coaxial alignment with the engine crank shaft and means including a pin which extends transversely to the aligned axes and a mating slot which engages the pin to impart the rotary motion of the engine crank shaft to the flexible shaft. Coupling and decoupling can be achieved while the engine is operating.

Another specific object of the invention is to allow decoupling of the auger shaft from the gear reduction drive shaft at any time during the boring operation. A bias spring is disposed against the auger shaft and generates a bias force which translates the auger shaft to its disengaged position. This bias force is easily overcome by pushing downward on the housing to thus translate the auger shaft upward into engagement with the reduction gear shaft. If at any time during the boring operation the operator wishes to stop rotation of the auger, he merely stops applying the downward pressure to allow the bias spring to disengage the auger shaft.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims herein for interpreting the scope of the invention.

DESCRIPTION OF THE PREFERRED EMBODIMENT

Figure 1:
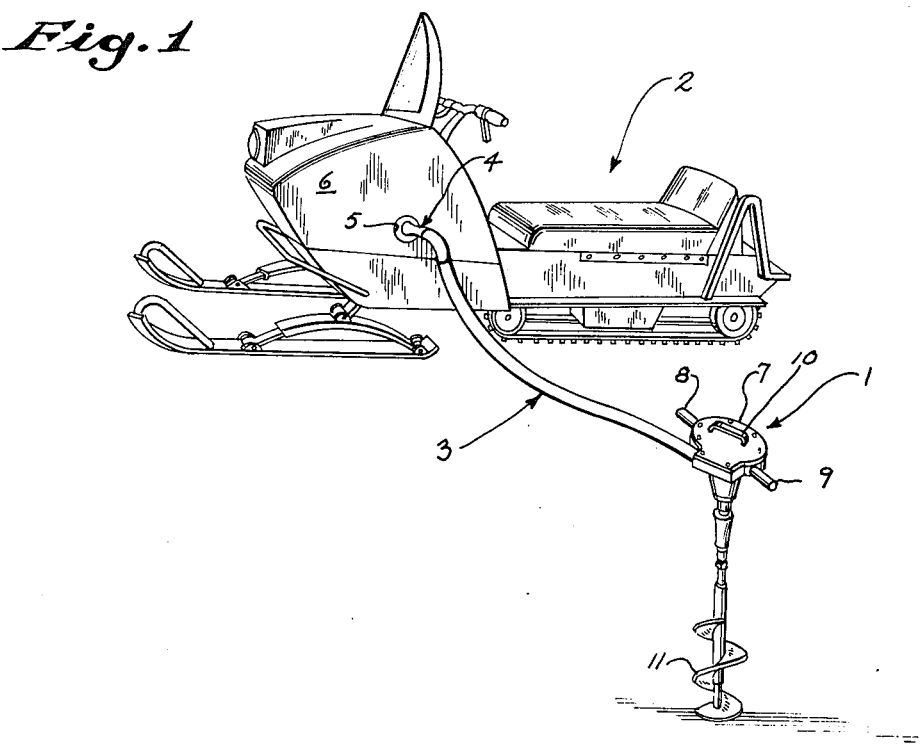
FIG. 1 is a pictoral view of an ice auger which incorporates the present invention.

Referring particularly to FIG. 1, a hand-held ice auger indicated generally at 1 is connected to the engine of a snowmobile 2 by a flexible shaft 3. The flexible shaft 3 is connected to the end of the snowmobile engine crank shaft by a coupler 4 which extends through an opening 5 in the cowl 6 that encloses the engine or connects directly to the engine crank shaft when the cowl 6 is raised. The flexible shaft 3 is a standard flexible shaft having ⅜ inch diameter and four-foot length which is commercially available from the Pennwalt Corporation of New York. The ice auger 1 includes a cast aluminum housing 7 having a generally circular perimeter from which a pair of handles 8 and 9 extend. A carrying handle 10 is also fastened to the top of the housing 7 to facilitate portage. A conventional, commercially available ice auger bit 11 extends downward from the housing 7 to engage the surface of the ice.

Figure 2:
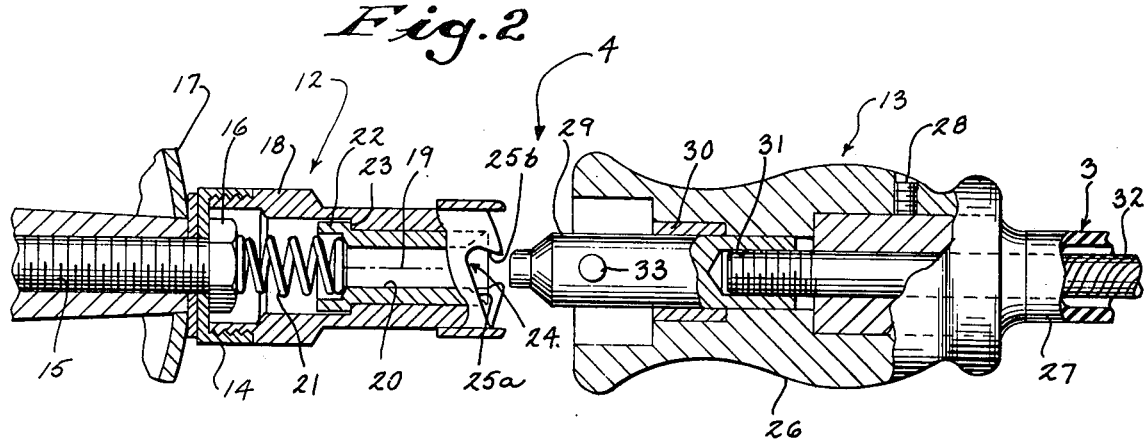
FIG. 2 is an elevation view with parts cut away of the two-piece coupler which connects the flexible shaft to the engine crank shaft.
Figure 3:
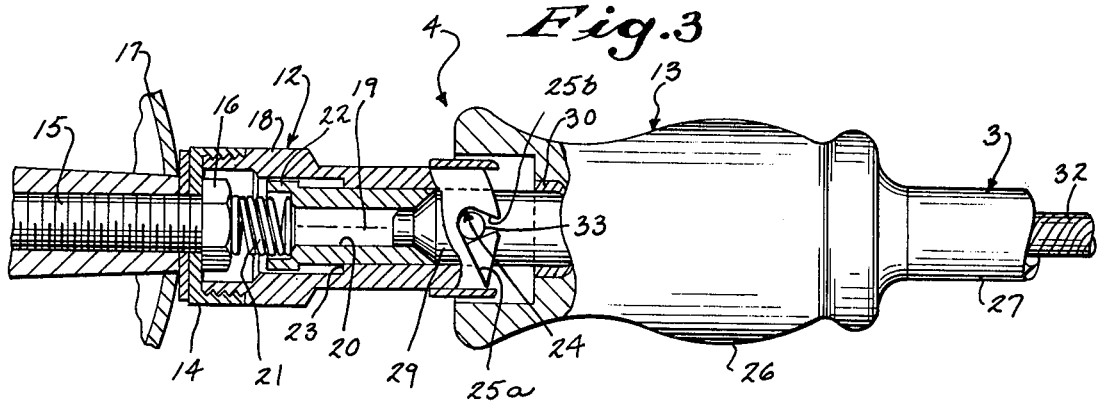
FIG. 3 is an elevation view with parts cut away of the coupling of FIG. 2 showing the two parts connected.

Referring particularly to FIGS. 2 and 3, the coupler 4 which attaches the flexible shaft 3 to the snowmobile engine crank shaft includes a female element 12 and a male element 13. The female element 12 includes a cup-shaped base 14 which is fastened to the snowmobile crank shaft 15 by a nut 16 which also serves to retain the snowmobile clutch 17 in place. The base 14 is threaded to receive and fasten a circular sleeve portion 18 which extends outward, coaxially with respect to the crank shaft axis of rotation 19. A circular cylindrical guide member 20 is coaxially mounted within the sleeve 18 for sliding motion along the axis 19. A bias spring 21 is disposed between the inner end of the guide member 20 and the nut 16 to force the guide member 20 to its outwardmost position in which a flange 22 thereon engages a stop 23 formed on the interior of the sleeve 18. A pair of slots 24 are formed in the outer end of the sleeve 18 on opposite sides of the axis of rotation 19. Each slot 24 is defined by a gently sloping ramp portion 25a and a sharply inclined cam portion 25b.

The male element 13 of the coupler 4 includes an outer sleeve which is contoured in the shape of a grip, or handle 26. The flexible shaft 3 is received at one end of an opening which extends through the handle 26 and its stationary, flexible protective cover 27 is fastened thereto by a set screw 28. A circular cylindrical pilot 29 is mounted for rotation within the handle 26 by a bushing 30. The pilot 29 includes a threaded opening 31 which receives and fastens to the end of the inner, rotating portion 32 of the flexible shaft 3. The other end of the pilot 29 is shaped to mate within the contoured outer end of the guide member 20 on the female element 12. A pin 33 is fastened transversely to the pilot 29 and extends radially outward on opposite sides thereof.

Referring particularly to FIG. 3, coupling is made between the two elements 12 and 13 by inserting the pilot 29 in the outer end of the guide member 20. When the longitudinal axis of the flexible shaft 3 is substantially aligned with the axis 19, the pilot 29 may then be pushed inward, compressing the bias spring 21 until the pin 33 engages the cam portion 25b of the slots 24. Attachment is accomplished while the snowmobile engine is rotating and the rotating sleeve 18 imparts rotation to the pin 33 to rotate the pilot 29 and attached flexible shaft 3. Due to the incline on the cam portions 25b, the torque applied to the pin 33 also generates an axially directed force which retains the pin 33 in the slots 24. This axially directed retaining force can be easily overcome, however, by grasping the handle 26 and pulling the male element 33 free.

Figure 4:
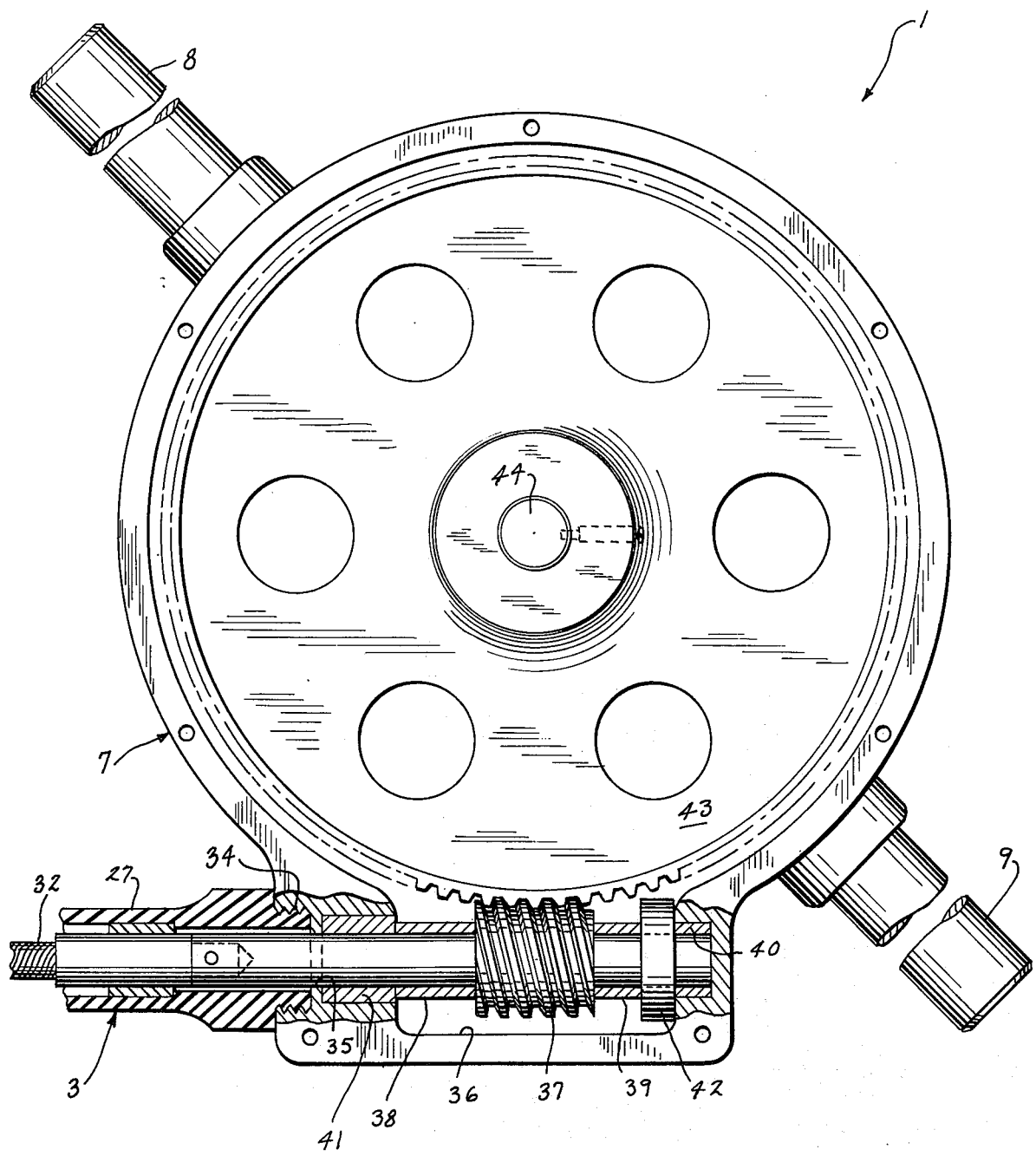
FIG. 4 is a top view with the cover removed of the hand-held housing and gear reduction means which forms part of the present invention.
Figure 5:
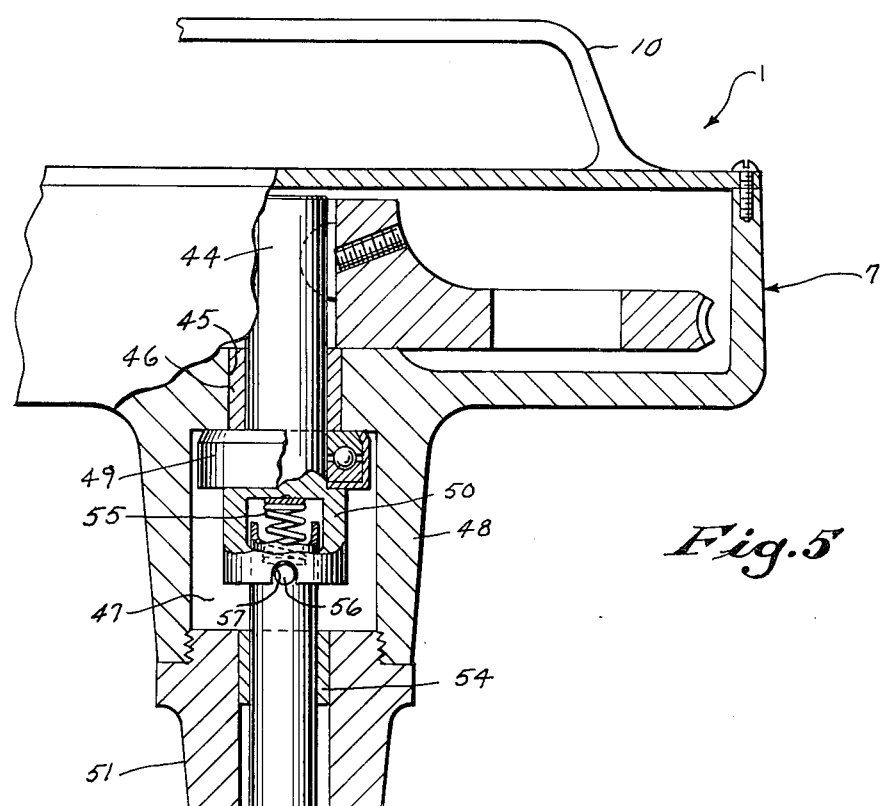
FIG. 5 is a partial side elevation view with parts cut away of the hand-held ice auger.
Figure 6:
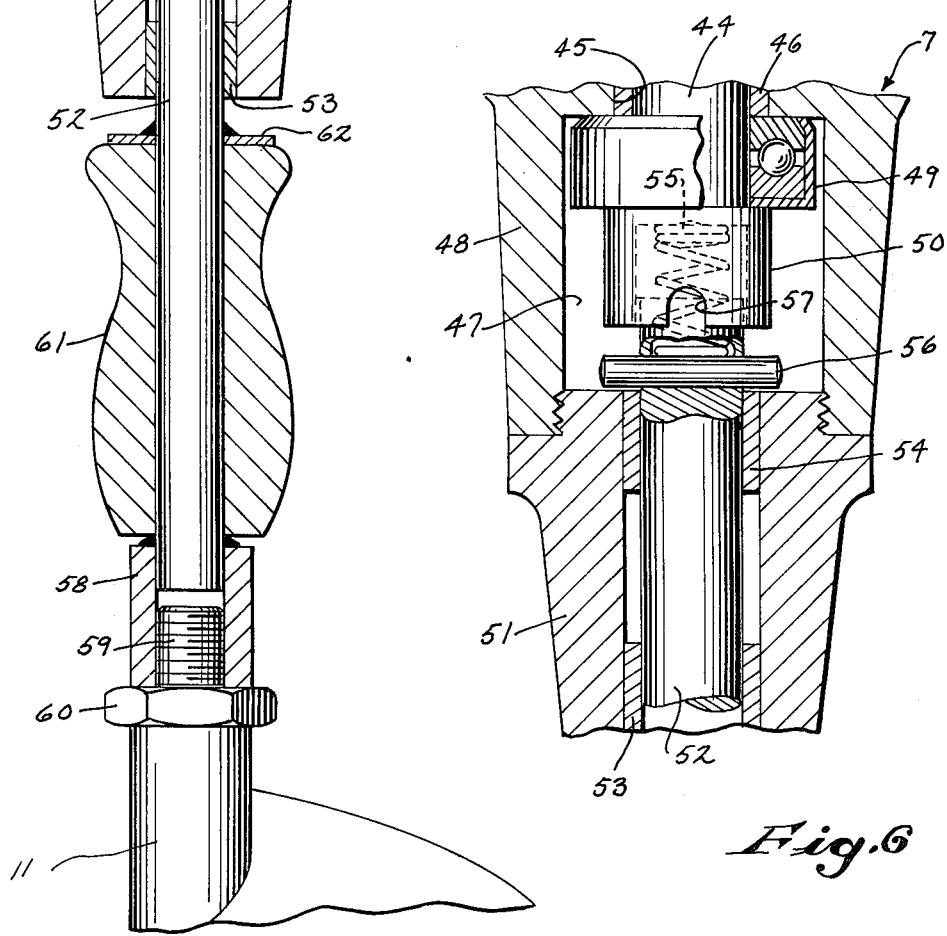
FIG. 6 is a partial elevation view with parts cut away of the hand-held ice auger of FIG. 5 showing the auger shaft disengaged.

Referring particularly to FIGS. 4, 5 and 6, the other end of the flexible shaft 3 is received in an opening 35 in the housing 7. The outer portion 27 of the flexible shaft 3 is enlarged and includes a threaded end 34 which is received and retained in the opening 35. The rotating inner portion 32 thereof extends through a chamber 36 which is formed in the interior of the housing 7 and it connects to and drives a worm 37 which is disposed therein. A pair of spacers 38 and 39 position the worm 37 substantially equidistant between a pair of opposing end walls of the chamber 36 and a Woodruff key (not shown in the drawings) locks the worm 37 to the rotating shaft 32. The shaft 32 is supported by the openings in each of the chamber end walls and bushings 40 and 41 are mounted therein to reduce friction. A thrust bearing 42 is disposed around the shaft 32 between the spacer 39 and bushing 40. The thrust bearing 42 withstands the axially directed reaction force imposed on the worm 37 during operation of the ice auger.

The worm 37 drives a worm gear 43 and together they provide means for reducing the speed of rotation by a factor of twenty and multiplying the torque by a corresponding amount. The worm gear 43 is mounted to a drive shaft 44 which extends downward through a central opening 45 formed in the housing 7 and which is rotatably supported therein by a bushing 46. The drive shaft 44 extends downward beneath the lower wall of the housing 7 into a circular cylindrical chamber 47 which is defined by an integrally formed annular wall 48 that extends downward from the housing 7. A thrust bearing 49 is disposed around the lower end of the drive shaft 44 to withstand the axially directed drilling forces, and a cup-shaped drive element 50 is formed on the lower end of the drive shaft 44 to retain the thrust bearing 49 in place.

The interior surface of the annular wall 48 is threaded to receive and retain a collar 51. The collar 51 is circular and includes a central opening which is coaxial with the axis of rotation of the drive shaft 44. An auger extension shaft 52 is rotatably supported within this opening by a pair of bushings 53 and 54 and its upper end extends into the cup-shaped drive element 50. A recess is formed in the upper end of the shaft 52 and a bias spring 55 is disposed therein and acts against a top wall of the drive element 50 to bias the auger extension shaft 52 into a disengaged position as shown in FIG. 6. A pin 56 extends transversely through the upper end of the auger extension shaft 52 and a pair of mating recesses, or slots 57 are formed in the lower end of the drive element 50. By applying a upward force on the auger extension shaft 52, or conversely, a downward force on the housing 7, the bias spring 55 is compressed and the pin 56 is brought into mating engagement with the slots 57 as shown in FIG. 5. When thus engaged, rotation of the drive shaft 44 is imparted to the auger extension shaft 52.

The auger extension shaft 52 extends downward a substantial distance below the collar 51 and is terminated by a threaded sleeve 58 which is welded to its lower end. A threaded shank 59 on the ice auger bit 11 is received by the threaded sleeve 58 and tightly fastened in place by an integral nut 60. A wooden sleeve contoured in the shape of a handle 61 is disposed above the threaded sleeve 58 and fits loosely around the auger extension shaft 52. A washer 62 is welded to the extension shaft 52 immediately above the handle 61 to restrain it against axial motion.

To use the invented ice auger, the flexible shaft 3 is connected to the snowmobile engine by inserting the male element 13 of the coupler 4 into the female element 12. Rotary motion is immediately coupled through the flexible shaft 3 to the reduction gear in the housing 7. Although rotary motion is thus immediately applied to the drive shaft 44, the auger shaft 52 remains disengaged therefrom by the operation of the bias spring 55. Rotary motion may be imparted to the ice auger bit 11 by grasping the handle 61 and pulling it upward, or in the alternative, resting the ice auger bit 11 on the surface to be bored and applying a downward pressure on the housing 7. If at any time during the boring process the operator wishes to stop rotation of the ice auger bit 11, he merely ceases applying the downward pressure on the housing 7. Immediate decoupling of the ice auger bit 11 is thus possible without the necessity of turning off the snowmobile engine. When boring is completed, the male element 13 of the coupler 4 may be pulled free of the rotating female element 12.

I claim:

1. A hand-held auger powered by a remotely located engine, the combination comprising:
   a flexible shaft;
   first coupling means fastened to one end of the flexible shaft for attaching it to a rotating shaft on said engine;
   a housing having an opening which receives the other end of said flexible shaft;
   gear reduction means disposed in said housing and including a drive shaft which is coupled for rotation by said flexible shaft at a substantially reduced rate therefrom;

an auger bit; and second coupling means for connecting the auger bit to said drive shaft, said second coupling means including:

an auger extension shaft which is rotatably mounted to said housing and extends through a second opening therein to connect with said auger bit, said auger extension shaft also being mounted for translational motion between an engaged position in which it couples to said drive shaft for rotation thereby and a disengaged position in which it is decoupled from said drive shaft;

a bias spring which urges said auger extension shaft into its disengaged position; and a handle which is disposed around said auger extension shaft and beneath said housing, said handle being restrained from motion along the axis of said auger extension shaft but being freely rotatable thereabout.

2. The hand-held auger as recited in claim 1 in which said second coupling means includes a drive element on said drive shaft which mates with a driven element on said auger extension shaft to impart rotary motion thereto when the auger extension shaft is disposed in its engaged position.

* * * * *